Figure 8:
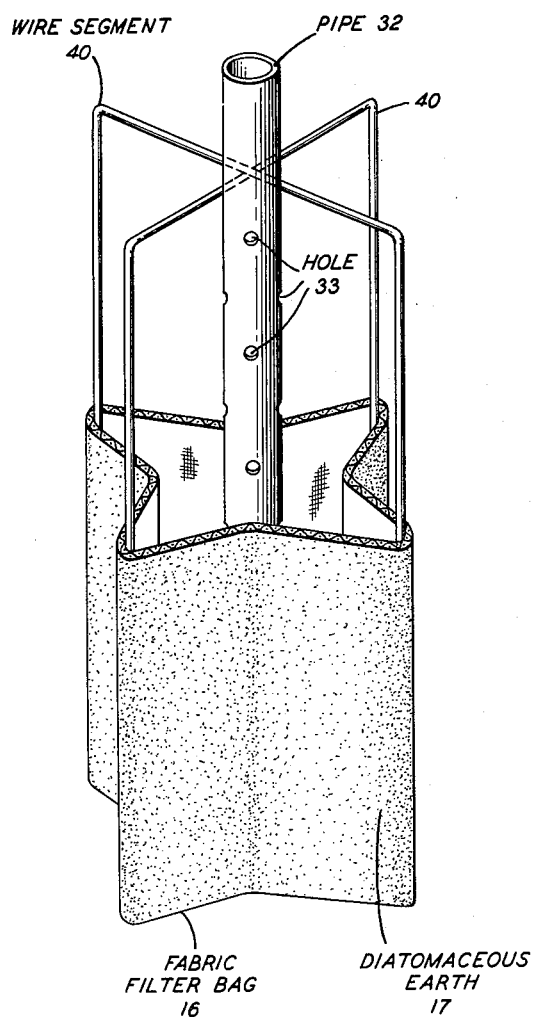

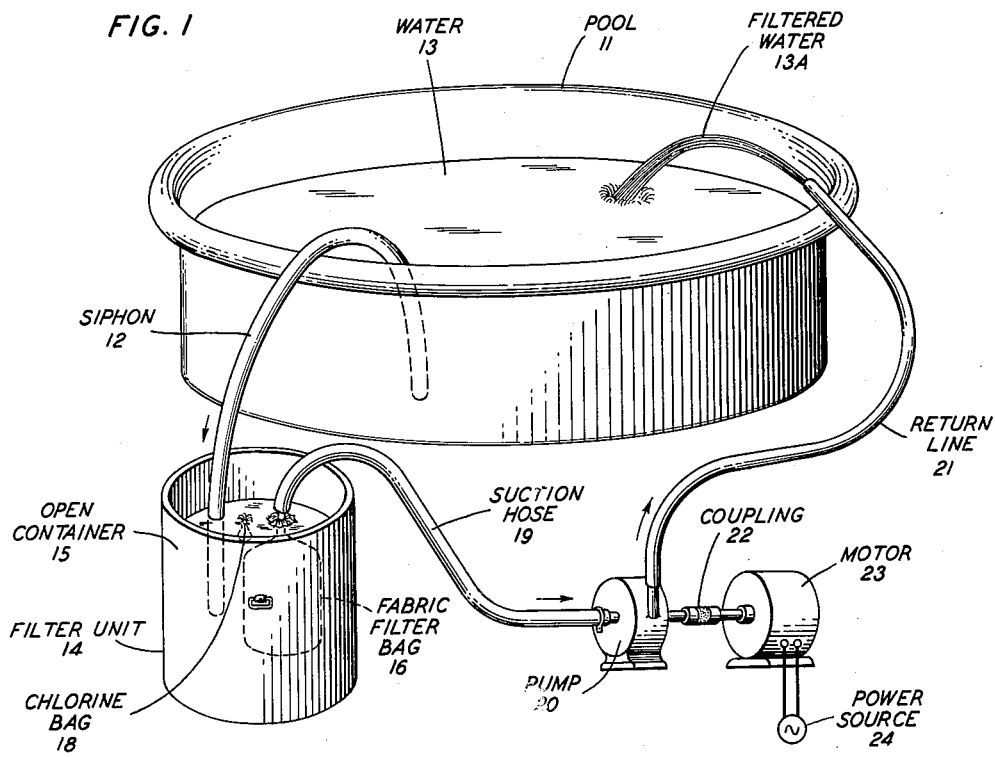
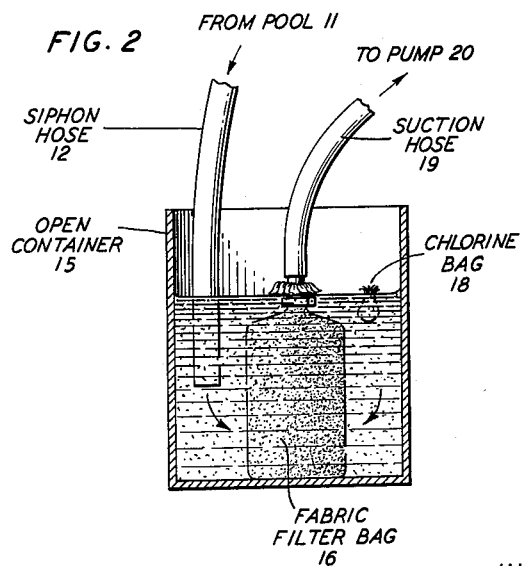
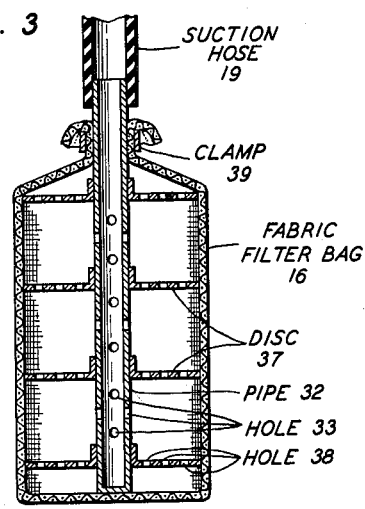

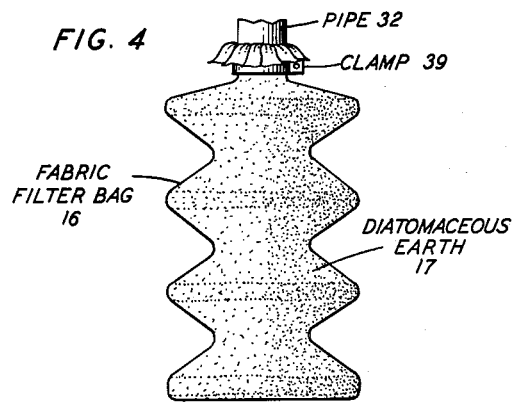
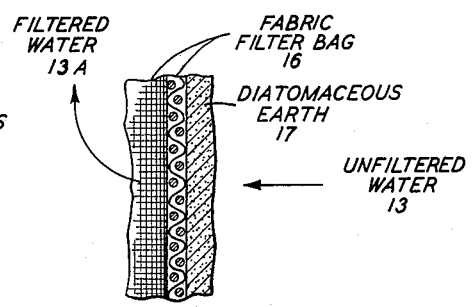
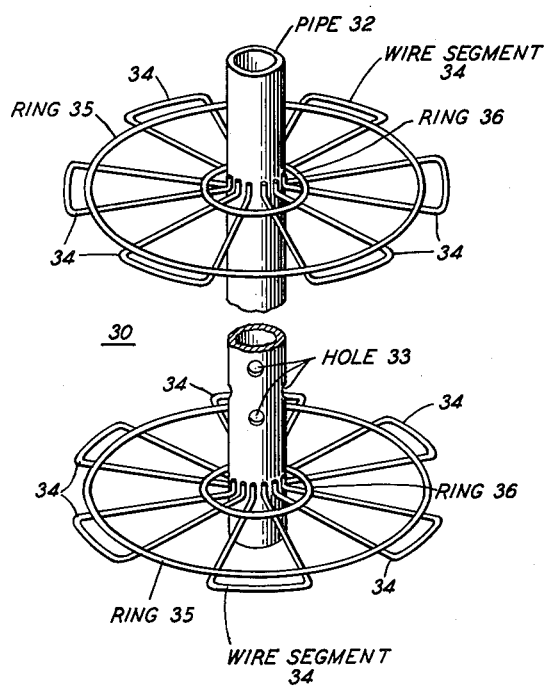
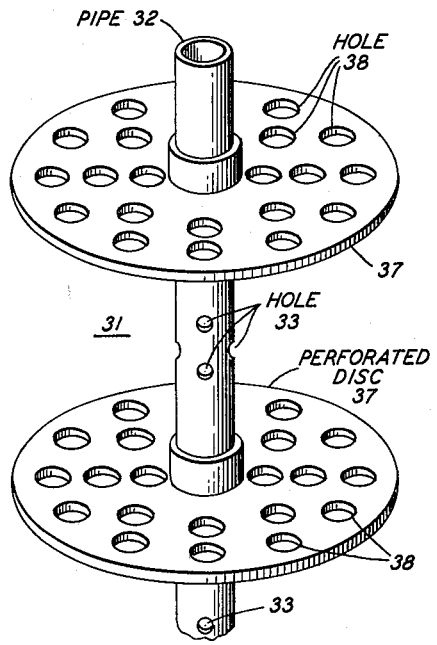

May 23, 1961 R. H. GRASMERE ET AL 2,985,307
WATER FILTERS
Filed Aug. 29, 1956 3 Sheets-Sheet 3

INVENTORS: ROBERT H. GRASMERE
BRUCE J. OLIVER
BY Charles Baraff
AGENT

United States Patent Office 2,985,307
Patented May 23, 1961

2,985,307
WATER FILTERS
Robert H. Grasmere, 11 Euclid Ave., Maplewood, N.J., and Bruce J. Oliver, Montclair, N.J. (232 E. Hickory St., Hinsdale, Ill.)

Filed Aug. 29, 1956, Ser. No. 606,854

10 Claims. (Cl. 210—169)

This invention relates to simple sediment filters, particularly for outdoor swimming pools, such as concrete pools and pools of the portable, plastic or rubber types and the like.

An object of this invention is to filter the sediment from a pool by depositing successive layers of diatomaceous earth onto the exterior of a filter bag of porous material pervious to water.

Another object of this invention is to syphon impure water from a swimming pool or the like into an open container filled with an aqueous suspension of fine diatomaceous earth or other filter particles and thence to build up successive layers of diatomaceous earth onto the exterior surface of a filter bag by a suction from the interior of the filter bag.

Another object of the invention is to form and deposit successive filtering layers of diatomaceous earth onto the outside of a porous filter by utilizing a combination of atmospheric and vacuum-like pressures operating exteriorly and interiorly of the bag respectively.

A feature of the invention is an open container containing a liquid suspension of diatomaceous earth and a porous bag located in the container having a suction hose connected thereto.

Another feature of the invention is a filter bag having a rigid frame therein contoured to increase the area of filtering surface and to stretch the pores thereof by internal suction action, as successive layers of diatomaceous earth are simultaneously deposited on its external surface.

Another feature of the invention is a filter container open to atmospheric pressure having a syphon connection thereto from the pool and a return line to the pool, the container having a filter bag therein on which are deposited layers of diatomaceous earth or other like filter material being deposited thereon by the suction of a pump, which layer can be easily shaken off with the adhering sediment when the suction of the pump is removed.

Referring to the figures of the drawing:

Fig. 1 shows a perspective view of a portable pool and the filtering system in accordance with the invention adjacent thereto, Fig. 2 shows an elevation view of the open filter container and the filter bag therein with hose connections, Fig. 3 shows a vertical section of the filter bag and its internal frame structure.

Figure 9:
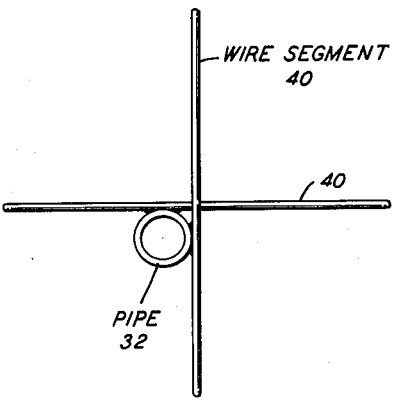
Figure 10:
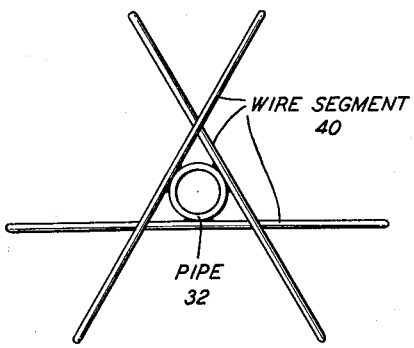

Figs. 4 and 5 show the filter bag with deposited layers of diatomaceous earth thereon, subjected to the suction from within which imparts greater surface area and porosity, Figs. 6 and 7 show elevation view of two species of frame structures for the interior of the filter bag, Figs. 8, 9, and 10 show elevation and sectional view of alternate forms of frame structures, respectively.

Outdoor swimming pools particularly have been found to gradually accumulate sediments and dirt, which render the water turbid, unsanitary and often unfit for the swimmers. Various schemes and methods have been devised for changing, filtering, or otherwise rendering the water clear and fit for swimming.

In accordance with the present invention, a simple effective filter for outdoor swimming pools has been provided by utilizing a syphon connecting the pool and an open container subjected to atmospheric pressures, wherein a filter bag of porous material is immersed in an aqueous suspension of diatomaceous earth substantially filling the container. The flow of pool water thru the syphon and into the container sets up a stream of diatomaceous particles which deposit to form filter layers onto the exterior surface of the bag and this action is caused by suction created in the bag by a motor driven pump. The impure water is sucked thru the external layers of diatomaceous earth caked on the bag, whereby its coarse impurities and sediments are caught in the deposited diatomaceous layers. The clear and filtered water passes freely thru the layers and the porous meshes of the bag and thence is returned to the pool in a continuous and aerated stream by the discharge of said pump via a flexible return line.

Referring to Fig. 1, a portable pool 11 of rubber or plastic material is shown containing pool water 13 having impurities and sediments therein. To filter and remove these impurities, a syphon 12 in the form of a flexible hose has one end thereof dipping into the pool water 13 and the other end thereof immersed in an aqueous suspension of diatomaceous earth held in container 15, whereby a flow of water is set up toward fabric filter bag 16 immersed in the container and its suspension.

The filter container 15 is a rigid plastic or metal cylinder open to the atmosphere and its fabric filter bag 16 rests in a cloudy suspension of diatomaceous earth therein. The impure water syphoned from the pool 11 into the container 15, as the arrow indicates in Fig. 2 causes a flow of pool water thru the fabric filter 16 assisted by the suction created by pump 20. A suction hose 19 connects the filter bag 16 at its open mouth portion to the pump 20, which is driven by electric motor 23 thru coupling 22.

In due course, the suspended particles are driven onto and caked on the exterior surface of the bag, remaining there as long as the internal suction prevails.

The filtering action primarily takes place on the exterior surface of filter bag 16 where diatomaceous particles from the liquid suspension are drawn by the stream toward the bag where they deposit to form built-up layers of diatomaceous earth on its exterior surface.

Such deposited layers of diatomaceous earth serve to catch and hold the sediment from the unfiltered pool water 13, while the filtered water 13A passes thru the fabric and is returned to the pool 11 via suction hose 19 and return line 21. The clear filtered water discharges back into the pool from return line 21 in a continuous stream as shown in Fig. 1.

The water returning to the pool 11 is directed into the air from the spout end of line 21 and this provides aeration and evaporative cooling, which is important for small pools so easily warmed by the sun. Some manifest advantages in having the fabric filter bag 16 over an open frame as in Fig. 6 and submerged in an open container 15, is that after long filtration, the bag may be cleaned by merely shutting off the pump 20 thereby stopping the suction and then agitating the filter bag by hand to shake off the coating and sediment caught thereon. The container may then be tilted to discharge its contents, and a new filling of liquid suspension of diatomaceous earth introduced therein.

It should be noted that the syphon maintains the liquid levels in the pool 11 and open container 15 of equal height under the action of atmospheric pressure.

In this manner, the water level in the open container 15 is self-regulating and maintains the level without causing overflow. A constant head of dirty water for the pump 20 to work on is thereby provided by the syphon hose 12, which should be wide enough to maintain the head and prevent it from decreasing.

By feeding the unfiltered water 13 to the filter container 15 via syphon, it is possible to provide an unpressurized filter chamber with a self-regulated water level. Overflow of the filter container 15 is rendered impossible because the syphon provides only as much water as is necessary to equalize the water levels in the pool 11 and container 15.

At times, it may be desirable to loop the syphon hose 12 upward under the water to provide a suction-like action at the top pool surface to skim off floating debris and dirt therefrom.

The open container 15 permits the condition of the filter to be visually inspected at any time. Also the filter bag 16 flexibly held therein can be swung clear when the waste is to be emptied from the container onto the ground or on a lawn. This dispenses with any need for valves or clean-out plugs.

Chemical control of pool water is easily obtained in the filter container 15 by floating or suspending a porous bag 18 containing chlorine tablets or powder which slowly dissolve as the water flows thru the system. The pool water is thereby uniformly chlorinated, with a consequent reduction in the costs of chemicals and with the elimination of possible "hot chemical" spots or areas in the pool. Other chemical treatment such as a control of alkalinity may be similarly carried out in this open filter container. Swimming may continue while chlorination is proceeding uniformly and continuously.

Referring to Fig. 2 there is shown an elevational view of the open container 15 and its filter bag 16, indicating particularly how the flow from syphon 12 and the suction created by the pump action in the interior of filter bag 16 causes a deposit and layering of diatomaceous earth on the exterior surface of the filter bag 16. The result of layering is also shown in sectional view in Fig. 5, wherein the arrow shows the stream of pool water 13 passing thru the layers 17 of diatomaceous earth and thru the porous meshes of the filter bag 16 to provide an exit stream of clear water 13A.

The filter bag 16 is made of porous flexible material and has an open mouth as shown in Figs. 2 and 3 for connection to suction hose 19. In lieu of a flexible bag, other porous receptacles may be substituted therefor suitable for the purpose.

Referring to Fig. 3, the filter bag 16 contains in its interior a rigid frame 31 comprising apertured, circular discs 37 mounted on a hollow pipe 32 with holes 33 therein for the flow or passage of water into suction hose 19. The open end of the filter bag 16 is clamped to hollow pipe 32 by a clamp 39. A perspective view of the disc frame 31 and its various parts is shown in Fig. 7.

The combined action of the suction generated by the pump 20 inside the bag 16 and the flow of water directed by the syphon stream, causes the cylindrical filter bag shown in Fig. 2 to assume the form of a concaved surface as illustrated in Fig. 4. This distension of the surface increases the amount of the filtering area for the deposition of the diatomaceous layers.

The distorted concave filter surface of the bag results in a large filtering area in a small volume, and in a distension of the pores of the fabric permitting easy flow of filtered water toward suction hose 19.

The flexibility of the bag and shape of the resulting surface Fig. 4 so formed also permits the easy removal and dropping off of the sedimented layers of diatomaceous earth, when the waste is to be discharged from the open container 15.

The filtration unit in open container 15 is simple to maintain and clean. The filter bag 16 being freely contained in the container can be easily cleaned. It is only necessary to stop the pump suction, thereby releasing the inward tension on the filter fabric. Thereafter, when the filter bag 16 is shaken gently from side to side, the caked layers of diatomaceous earth on its exterior float off into the surrounding water and can be discharged by tilting and emptying the container 15.

When the suction of the pump ceases to pull the filter fabric inward to produce the heretofore described concavity of surface, the filter bag assumes its original shape as disclosed in Figs. 2 and 3. The fabric material of the bag resumes its natural, loosely hanging shape, thus causing the filter cake to loosen and float off its surface.

Fig. 6 shows a preferred form of metallic frame for the interior of the filter bag 16, being particularly light and simple in construction. The frame 30 comprises a hollow pipe 32 as heretofore, with radial, wire segments 34 soldered thereto as shown. Concentric wire rings 35 and 36 join and hold the wire segments together to form a rigid frame. The water which passes thru the bag 16 is unimpeded in its flow by the openings in the wire segments 34, and the suction produces a flow upward in pipe 32 into the flexible rubber hose 19 connected thereto as illustrated in Figs. 1, 2, and 3.

Fig. 8 shows other and alternative species of rigid frames to be contained in the interior of filter bag 16. The wire frame comprises four rectangular, crossed segments 40 soldered to pipe 32 as shown in Fig. 9. The four wire loops 40 permit a vertical concavity to form in the surface of the fabric under suction, and thereby provides for increased filter area of the bag as the diatomaceous layers form and are built up on it.

Fig. 9 shows a form of wire frame similar to Fig. 8 but having 6 rectangular soldered loops 40, which permit the fabric bag held around it, to be dished in and distended to provide larger filtering areas similar to the construction of Fig. 8.

It should be understood by those skilled in the art of filters that this invention may be used in other connections such as the filtration of brine, or the filtration of solids from industrial wastes in which syphon-feeding, self-cleansing features, and complete visibility of components are desirable.

It should be understood that in cleaning the filter bag of adherent dirt and deposited sediment, the junction between the end of the suction hose and the pipe member of the internal frame, constitutes a handle for manipulation in shaking off the sediment and layers of earth. The sediment often falls to the bottom and the diatomaceous earth particles go back into suspension. Moreover, it should be understood that it is not necessary to dump the diatomaceous earth filter and particles each cleaning time, but that they may be reused thru multiple filter runs.

It should also be understood that in lieu of a chemical bag, that blocks or pellets of chemical purifier may be put in the open container for uniform dissolution therein and addition to the pool in the stream of purified water returned thereto.

What is claimed is:

1. In combination, a pool, an open container adjacent thereto containing a suspension of filter particles for depositing a filter film, a syphon hose connecting the two, a filter bag in said container having built up layer of filter particles on the outside thereof, a suction hose and suction pump connected to the other side thereof, said suction hose connected to the suction side of said pump, whereby the discharge from said pump projects filtered water into the atmosphere and back into said pool said suction hose being flexible and connected directly to the bag whereby the filter layers may be shaken and returned to the suspension form when the suction is removed.

2. A filter for a swimming pool comprising an open container, a syphon connected therebetween for equalizing levels therein, said open container adapted to have an aqueous suspension of diatomaceous earth therein for precoating, a filter bag of permeable fabric material having a flexible hose connected thereto whereby the bag is flexibly supported in said container, a suction pump for simultaneously producing a negative pressure inside said filter bag means connected to the suction pump and for discharging the filtrate back into said pool.

3. The structure of claim 2, wherein the filter bag is provided with an apertured metal frame and said suction alters the shape of the filter bag around the frame to provide a larger concaved filtering surface as said diatomaceous earth is deposited thereon in a filtering layer.

4. A pool filter comprising two open liquid containers connected by a syphon, one container adapted to have an aqueous suspension of diatomaceous earth therein, a filter bag of permeable fabric material, a flexible hose directly connected to said bag for flexibly supporting said filter bag in the latter container, said filter bag having a metal frame therein and a suction pump and a discharge nozzle for filtered water are connected to the filter bag whereby the flow of water thru the syphon and a negative pressure in the interior of the filter bag precipitates a filter layer of diatomaceous earth on the exterior of said filter bag.

5. The structure of claim 4 wherein the metal frame permits the fabric to be drawn inwardly by suction to alter its surface area concavity and return to its original shape when the suction is removed.

6. The structure of claim 4, wherein the metal frame comprises two parallel radial members connected to an apertured pipe forming a longitudinal axis for the filter bag.

7. The structure of claim 4 wherein said metal frame has radial segments in parallel planes providing appreciable openings permeable to liquid flow and permitting the fabric to be drawn inwardly by said suction means to increase the filtering surface and provide multiple spaced concavities in the fabric between the parallel planes.

8. The structure of claim 1 wherein said filter bag is removably connected to the suction pump by a flexible hose handle to permit the shaking-off of the diatomaceous filter layer and the sediment trapped therein without removing the bag from said container.

9. The structure of claim 1 having a discharge hose connected between said pump and pool for recirculating filtered water thru the pool.

10. The structure of claim 2 wherein said flexible bag has a rigid metal frame and a hollow apertured pipe contained therein, said frame consisting of apertured radial supports connected to said pipe in parallel planes.

References Cited in the file of this patent

UNITED STATES PATENTS

| | | |
|---|---|---|
| 426,945 | Maignen | Apr. 29, 1890 |
| 946,862 | Patterson | Jan. 18, 1910 |
| 1,607,027 | Wall | Nov. 16, 1926 |
| 1,884,615 | Dooley | Oct. 25, 1932 |
| 2,027,681 | Durant et al. | Jan. 14, 1936 |
| 2,072,976 | Andrus | Mar. 9, 1937 |
| 2,221,210 | Soderquist | Nov. 12, 1940 |
| 2,233,467 | Bachman | Mar. 4, 1941 |
| 2,347,092 | Evans | Apr. 18, 1944 |
| 2,523,793 | Vance | Sept. 26, 1950 |
| 2,600,458 | Ackley et al. | June 17, 1952 |
| 2,610,740 | Hunter | Sept. 16, 1952 |
| 2,783,893 | Romanoff | Mar. 5, 1957 |
| 2,792,943 | Mackintosh | May 21, 1957 |
| 2,826,307 | Pace | Mar. 11, 1958 |
| 2,844,255 | Cavenah et al. | July 22, 1958 |
| 2,874,845 | Fain et al. | Feb. 24, 1959 |
| 2,878,938 | Dee | Mar. 24, 1959 |

FOREIGN PATENTS

| | | |
|---|---|---|
| 15,354 | Great Britain | A.D. 1896 |
| 675,845 | Great Britain | July 16, 1952 |
| 1,085,481 | France | Feb. 2, 1955 |